April 9, 1929.  W. S. CLARK  1,708,785
ELECTRIC CABLE

Filed May 29, 1924

Inventor:
Wallace S. Clark,
by
His Attorney.

Patented Apr. 9, 1929.

1,708,785

UNITED STATES PATENT OFFICE.

WALLACE S. CLARK, OF SCHENECTADY, NEW YORK, ASSIGNOR TO GENERAL ELECTRIC COMPANY, A CORPORATION OF NEW YORK.

ELECTRIC CABLE.

Application filed May 29, 1924. Serial No. 716,779.

The present invention relates to electric power transmission, and more especially to high potential metal-sheathed cables adapted for submarine or underground installation.

For economical transmission of electrical power over considerable distances, it is necessary that the potential thereof be very high, and, in order to prevent the escape of the electric current from the conductor, the latter is required to be insulated in proportion to the potential. When the conductor is to be used under ground or under water, it is common practice to enclose it in relatively thick insulation of high dielectric value and encase the whole in a water-tight metal sheath, such as lead pipe formed in place thereon.

The insulation of present day commercial cables for high potential power transmission is accomplished by wrapping a large number of layers of tapes of paper or cambric about the conductor cable, heating the wrapped cable to drive off moisture, subjecting it to vacuum to remove all traces of moisture and air and then immersing it in a bath of liquid or semiliquid insulating substance, such as petrolatum. Thereafter the lead sheath is formed in place.

Much difficulty has been experienced heretofore in obtaining a complete impregnation of the insulated cable especially when made in great lengths. Where air pockets or voids exist or even if there be but a single one in a length of cable, the whole is rendered defective and liable to break down upon the application of high electric potential.

The object of my invention is the production of an improved electric cable which may be made in any desired lengths without voids or air pockets and which shall have its greatest dielectric strength nearest the conductor.

Figure 1:
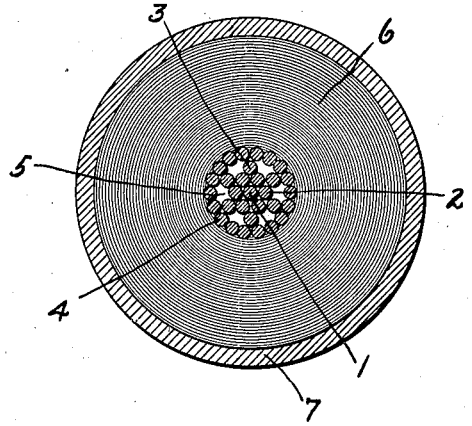
Figure 2:
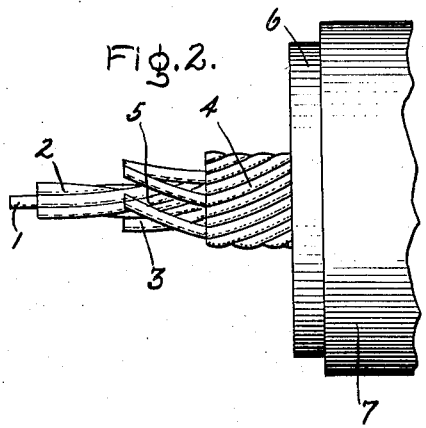

One embodiment of the invention is shown in the accompanying drawing, in which Fig. 1 is a cross section of the cable, and Fig. 2 is a side elevation of one end thereof with the elements drawn out to more clearly show its structure.

The conductor is shown composed of thirty-one strands of copper wire built up as follows: A center strand 1, six strands 2 laid up spirally about the center strand, a second layer of six strands 3 laid up helically in spaced relation about the strands 2 of the first layer but on an oppositely directed spiral, and a third layer of eighteen strands 4 laid up about the second layer of strands 3 but on a spiral opposite thereto. There is thus produced a round cable with six open spiral passageways 5 extending the entire length thereof and with but a single layer of strands 4 between them and the insulation 6 wound outside the latter layer. The cable may of course be composed of a greater or less number of strands where desired.

The insulation 6 is built up of a large number of concentric cylinders composed of cambric or paper tapes, each smoothly and tightly wound on the preceding layer so as to break joints.

After completion of the winding of the layers of insulation 6, the cable is subjected to heat and vacuum treatments for a sufficient period of time to remove substantially all moisture and air therefrom and is then immersed in a bath of insulating liquid or semi-liquid in such manner as to permit free circulation of the liquid insulation into the passageways 5 and throughout the length thereof.

On account of the several passageways 5 being adjacent the outer layer of strands 4, there is as free access of the vacuum treatment to the inside wrappings as to the outside wrappings. Moreover, the insulating liquid circulates freely throughout the length of the passageways and passes readily between the strands of the outer layer of the cable into contact with the insulating wrappings thereon and impregnates them outwardly, while the liquid in contact with the outer wrappings impregnates inwardly.

After the insulating wrappings 6 have been thoroughly impregnated, the cable is passed through a lead press and the outer sheath 7 applied in the usual manner.

While I have shown and described the best embodiment of the invention known to me, I do not desire to be restricted thereto.

What I claim as new and desire to secure by Letters Patent of the United States, is,—

1. A sheathed electric cable having a conductor comprising a layer of strands with open spaces between said strands and another layer of strands laid up helically about and in contact with said layer of spaced strands, and fibrous insulation between said conductor and the cable sheath.

2. A sheathed electric cable having a conductor comprising an inner layer of helical strands, a second layer of strands laid up thereabout in spaced relation helically opposite to the strands of the first layer, a third layer of strands laid up helically opposite to said second layer of strands, and fibrous insulation between said conductor and the cable sheath.

In witness whereof, I have hereunto set my hand this 28th day of May, 1924.

WALLACE S. CLARK.